United States Patent [19]

Sumimoto et al.

[11] Patent Number: 5,048,373
[45] Date of Patent: Sep. 17, 1991

[54] CONTROL APPARATUS FOR AUTOMATIC TRANSMISSION

[75] Inventors: Takayuki Sumimoto; Shunichi Egawa; Takahiro Kyohzuka, all of Hiroshima, Japan

[73] Assignee: Mazda Motor Corporation, Hiroshima, Japan

[21] Appl. No.: 577,104

[22] Filed: Sep. 4, 1990

[30] Foreign Application Priority Data

Sep. 1, 1989 [JP] Japan .................. 1-228103

[51] Int. Cl.⁵ .......................................... B60K 21/02
[52] U.S. Cl. ....................................... 74/866; 74/865; 74/870; 74/871; 74/877
[58] Field of Search ............... 364/424.1; 74/865, 866, 74/870, 871, 877

[56] References Cited

U.S. PATENT DOCUMENTS 2,783,658  3/1957  Sarto ....................... 74/871
3,733,930  5/1973  Mizote ..................... 74/866
4,688,452  8/1987  Aoyama et al. ............. 74/869

FOREIGN PATENT DOCUMENTS

63-46302  9/1988  Japan .

Primary Examiner—Allan D. Herrmann
Assistant Examiner—William O. Trousdell
Attorney, Agent, or Firm—Staas & Halsey

[57] ABSTRACT

A control apparatus for an automatic transmission is disclosed which has shift valves to which a kickdown pressure, governor pressure corresponding to vehicle velocity and throttle pressure are applied, wherein the shift valves are changed over in dependence upon an equilibrium. The apparatus controls the application of the kickdown pressure to the shift valves. When the transmission speed detected during the kickdown operation is a relatively lower speed and vehicle velocity is rising, the kickdown pressure is applied within a first velocity region (Z1 or Z4) on a lower velocity side of a first vehicle velocity ($V_{U21}$ or $V_{U31}$) which is less than an engine overrun point ($V_{o1}$ or $V_{o2}$); it is not applied within a second velocity region (Z2 or Z5) which is set from the first vehicle velocity to a second vehicle velocity which exceeds the engine overrun point ($V_{o1}$ or $V_{o2}$); and it is applied within a third velocity region (Z3 or Z6) which exceeds the second vehicle velocity.

12 Claims, 6 Drawing Sheets

CONTROL APPARATUS FOR AUTOMATIC TRANSMISSION

BACKGROUND OF THE INVENTION

This invention relates to a control apparatus for an automatic transmission and, more particularly, to control at kickdown.

In general, a hydraulic pressure control circuit used in an automatic transmission is provided with a plurality of shift valves conforming to the number of transmission speeds. In order to perform an automatic shift that conforms to vehicle velocity and the opening of a throttle valve (which controls the amount of intake air), an automatic transmission of this kind is further provided with a valve (referred to as a "governor valve") which generates pressure (referred to as "governor pressure") corresponding to vehicle velocity, and a valve (referred to as a "throttle valve") for generating pressure (referred to as "throttle pressure" corresponding to the engine load (which, for example, is judged based on the opening of the throttle valve). The governor pressure and throttle pressure, which vary depending upon the vehicle velocity and load, act upon the abovementioned shift valves, and it is so arranged that the operating points of these shift valves are decided in dependence upon the equilibrium point of the two pressures, as a result of which a speed change (shift) is performed automatically in conformity with vehicle velocity and throttle valve opening.

In addition to the foregoing, an automatic transmission is also required to exercise control in such a manner that when the driver steps down on the accelerator pedal by a large amount to perform a so-called "kickdown operation", a downshift will be made to low gear to cope with the high load required. Then, if the vehicle velocity rises after the downshift, control is performed so as to make an upshift to high gear.

An example of an automatic transmission which makes such a kickdown operation possible is disclosed in the specification of Japanese Patent Publication (KOKOKU) No. 63-46302. In this disclosed automatic transmission, a kickdown valve is provided and is adapted to generate kickdown pressure. By introducing this kickdown pressure to a shift valve, the latter is changed over to the downshift side. More specifically, kickdown pressure is superimposed on throttle pressure within the shift valve. Since the equilibrium point of this superimposed pressure and the aforementioned governor pressure moves, the operating point of the shift valve changes. The operating point of this shift valve causes the shift point to move toward the high velocity side, i.e., causes the downshift to low gear to take place automatically.

In such an automatic transmission so constructed that kickdown pressure is introduced to a shift valve, not only does the shift point in the downshift move toward the side of higher vehicle velocity but so does the shift point at which the upshift is performed after the downshift.

Figure 1:
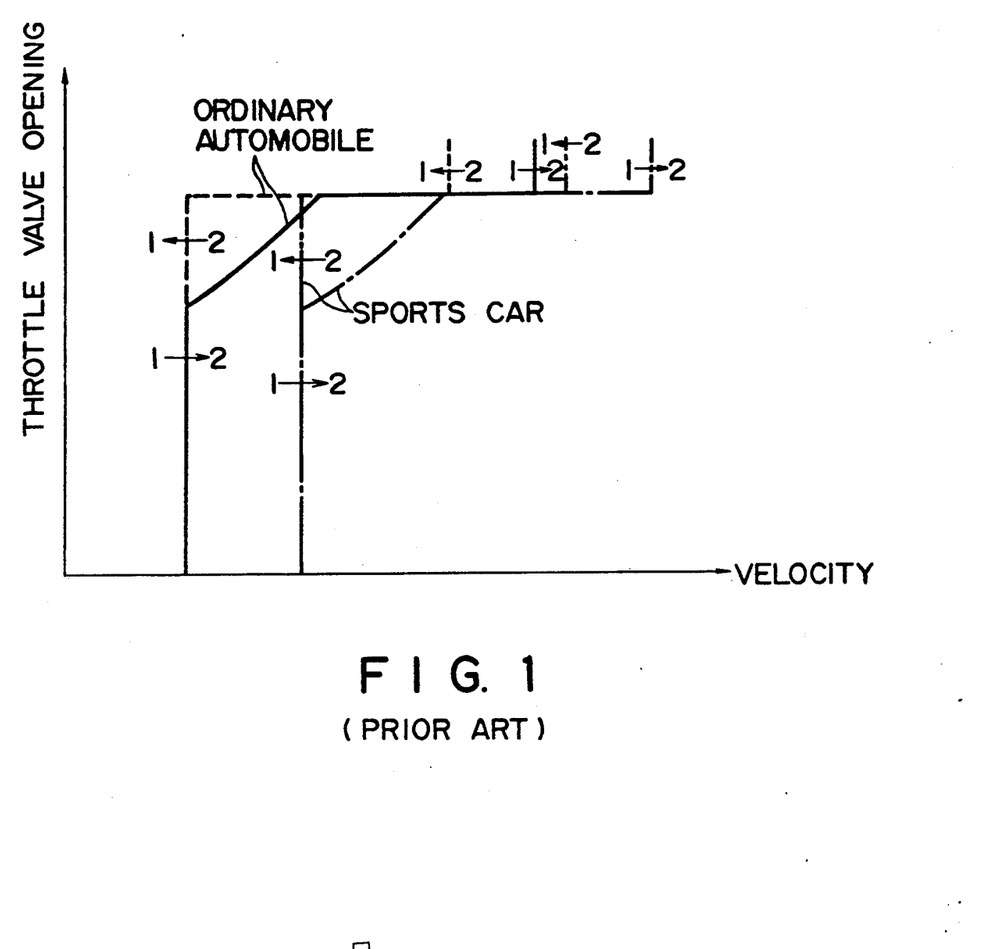
FIG. 1 is a diagram for describing the problems encountered in the prior art.

In order that parts may be used universally, the same transmission is sometimes employed in automobiles of different types. When such is the case and the same transmission is installed in an automobile of a sportier type, for example, it is generally required that the shift point be set on the side of higher vehicle velocity for purposes of tuning. Accordingly, when an automatic transmission equipped with a kickdown valve is installed in a sporty-type automobile and the aforementioned tuning is carried out, a problem is encountered. Specifically, as shown in FIG. 1, assume that a 2→1 shift line of an ordinary automobile, indicated by the dashed line, is moved to the side of higher vehicle velocity, which is indicated by the alternate long and two short dashed line, as required by the specifications of a sports car. When this is done, the upshift line for a 1→2 upshift following the downshift also moves to the side of higher vehicle velocity, as illustrated in FIG. 1. In actuality, when the driver performs the kickdown operation, first a downshift is made from 2nd speed to 1st speed. Then, as vehicle velocity subsequently rises, an upshift from low to high gear is carried out in accordance with the 1→2 shift line of FIG. 1. On the other hand, all engines possess an overrun vehicle velocity, and it is undesirable to rotate the engine at an rpm that exceeds this velocity. The overrun vehicle velocity is not changed by the aforementioned tuning. Accordingly, there are cases where tuning inconveniently causes the 1→2 upshift line to become situated on the side of vehicle velocity higher than the overrun velocity. As a result, there are instances where, because of tuning, the changeover to the high speed side of the transmission gears is delayed, thereby causing the engine to overrun.

Measures can be taken to solve this problem. Specifically, even if the timing at which an upshift is performed following a downshift happens to move to the side of higher vehicle velocity, the action of kickdown pressure can be cancelled by exercising control to forcibly turn off the kickdown valve at the moment actual vehicle velocity reaches a predetermined vehicle velocity prior to a velocity at which engine overrun would occur. If this is done, the shift valve for low gear will change over to the upshift side at the moment the action of kickdown pressure is cancelled. Overrun can be avoided as a result.

However, this expedient involves certain drawbacks. Specifically, the kickdown pressure produced by the kickdown valve is introduced commonly to each of the shift valves which perform the 1-2 speed changeover and 2-3 speed changeover. In an automatic transmission which is so designed that the kickdown valve is forcibly turned off at vehicle velocities above a predetermined value, as in the above-described expedient, the kickdown valve will not operate in a case where the driver performs the kickdown operation while the vehicle is traveling in third or fourth gear at a velocity above the predetermined value. As a consequence, the shift valve for high gear will not change over and kickdown will not take place.

SUMMARY OF THE INVENTION

An object of the present invention is to provide a control apparatus for an automatic transmission having a mechanism which produces kickdown pressure applied to shift valves to make possible kickdown control, wherein engine overrun is prevented in a kickdown operation when the vehicle is traveling in low gear, and the kickdown operation can be performed with assurance at kickdown executed when the vehicle is traveling in high gear.

An automatic transmission to which a control apparatus for attaining the foregoing object can be applied has means for generating kickdown pressure, means for generating governor pressure corresponding to vehicle velocity, means for generating throttle pressure corresponding to engine load, and shift valves to which the kickdown pressure, governor pressure and throttle pressure are introduced, wherein the shift valves are changed over in dependence upon an equilibrium relationship among these pressures and are provided in a number corresponding to a number of transmission speeds.

The control apparatus comprises speed detecting means for detecting transmission speed, operation detecting means for detecting a kickdown operation performed by a driver, vehicle velocity detecting means for detecting vehicle velocity, and control means which receives outputs from the speed detecting means, operation detecting means and vehicle velocity detecting means for controlling an active region of the kickdown pressure introduced to the shift valves, wherein when the transmission speed detected during the kickdown operation is a relatively lower speed and vehicle velocity is rising, the kickdown pressure is:

(a) applied within a first velocity region (Z1 or Z4) on a lower velocity side of a first vehicle velocity ($V_{U2I}$ or $V_{U3I}$) which is less than an engine overrun point ($V_{o1}$ or $V_{o2}$);

(b) not applied within a second velocity region (Z2 or Z5) which is set from the first vehicle velocity to a second vehicle velocity which exceeds the engine overrun point ($V_{o1}$ or $V_{o2}$); and (c) applied within a third velocity region (Z3 or Z6) which exceeds the second vehicle velocity.

In accordance with this control apparatus, when there is a requirement for kickdown in which the driver depresses the accelerator pedal by a large amount, the active region in which kickdown pressure acts upon the shift valves is made to differ between that which prevails when vehicle velocity is rising under a high load and it appears that engine rpm will overrun, and that which prevails when kickdown is actually necessary. In other words, the cases (a), (b) and (c) mentioned above respectively correspond to a control countermeasure for an instance where it appears that engine rpm is about to overrun and a control countermeasure for an instance where kickdown is actually required.

In an aspect of the present invention, the control apparatus further controls to apply the kickdown pressure to the shift valves when a travelling condition of the vehicle enters a kickdown region during travelling in a lower region (Z2) of the second velocity region. The kickdown region is defined as a region in which the engine load is larger than a prescribed value.

In another aspect of the present invention, the control apparatus further controls not to apply the kickdown pressure to the shift valves when a travelling condition of the vehicle enters a kickdown region during travelling in a higher region (Z4 or Z5) of the first or second velocity region. The kickdown region is defined as a region in which the engine load is larger than a prescribed value.

In a preferred embodiment of the invention, the high transmission speed is 2nd speed in a case where the low transmission speed is 1st speed.

In another preferred embodiment of the invention, the high transmission speed is 3rd speed in a case where the low transmission speed is 2nd speed.

In another preferred embodiment of the invention, the high transmission speed is 3rd speed in a case where the low transmission speed is 1st speed.

In still another preferred embodiment of the invention, when the low transmission speed is 1st speed, the intermediate transmission speed is 2nd speed and the high transmission speed is 3rd speed, the second vehicle velocity ($V_{U2II}$) of the lower region (Z2) of the second velocity region is larger than a maximum vehicle velocity ($V_{32}$) along a downshift line from 3rd speed to 2nd speed in a case where kickdown control is not carried out, and is smaller than a maximum vehicle velocity ($V_{23}$) along an upshift line from 2nd speed to 3rd speed in a case where kickdown control is not carried out. When the engine load is increased and then the kickdown region is entered into during travelling in the second velocity region (Z2) with 3rd transmission speed, the kickdown pressure is applied to shift down the transmission to 2nd speed.

In yet another preferred embodiment of the invention, when the low transmission speed is 1st speed and the high transmission speed is 2nd speed, an upper-limit vehicle velocity ($V_{U2I}$) of the first velocity region regarding 1st speed is a maximum vehicle velocity ($V_{D1}$) along an ordinary downshift line from 2nd speed to 1st speed in a case where kickdown control is carried out.

In yet another preferred embodiment of the invention, in a case where vehicle velocity $V_{D2}$ at which a shift is made from 3rd speed to 2nd speed during kickdown control is within the kickdown region and is higher than vehicle velocity $V_{U3I}$ at which it is possible to perform an upshift from 2nd speed to 3rd speed due to the increase in the vehicle velocity, the velocity at which a shift is made from 3rd speed to 2nd speed is changed from $V_{D2}$ to $V'_{D2}$ which is lower $V_{U3I}$. when the kickdown region is entered due to the increase in the engine load at a velocity in a region (Z4) between $V_{D2'}$ and $V_{U3I}$, the kickdown pressure is not applied and 3rd speed is maintained.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such an example, however, is not exhaustive of the various embodiments of the invention, and therefore reference is made to the claims which follow the description for determining the scope of the invention.

DESCRIPTION OF THE PREFERRED EMBODIMENT

Figure 4:
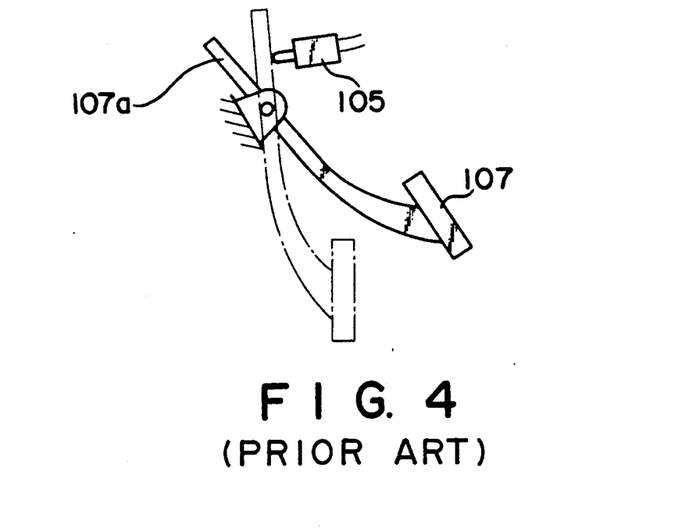
FIG. 4 is a diagram for describing the arrangement of a kickdown switch.

An embodiment in which the control apparatus of the present invention is applied to an automatic transmission having four forward speeds and one reverse speed will be described based upon the drawings from FIG. 2 onward. In the embodiment, the kickdown operation performed by the driver is detected, for example, by a switch provided near the accelerator pedal, as shown in FIG. 4.

Control System Configuration

Figure 2:
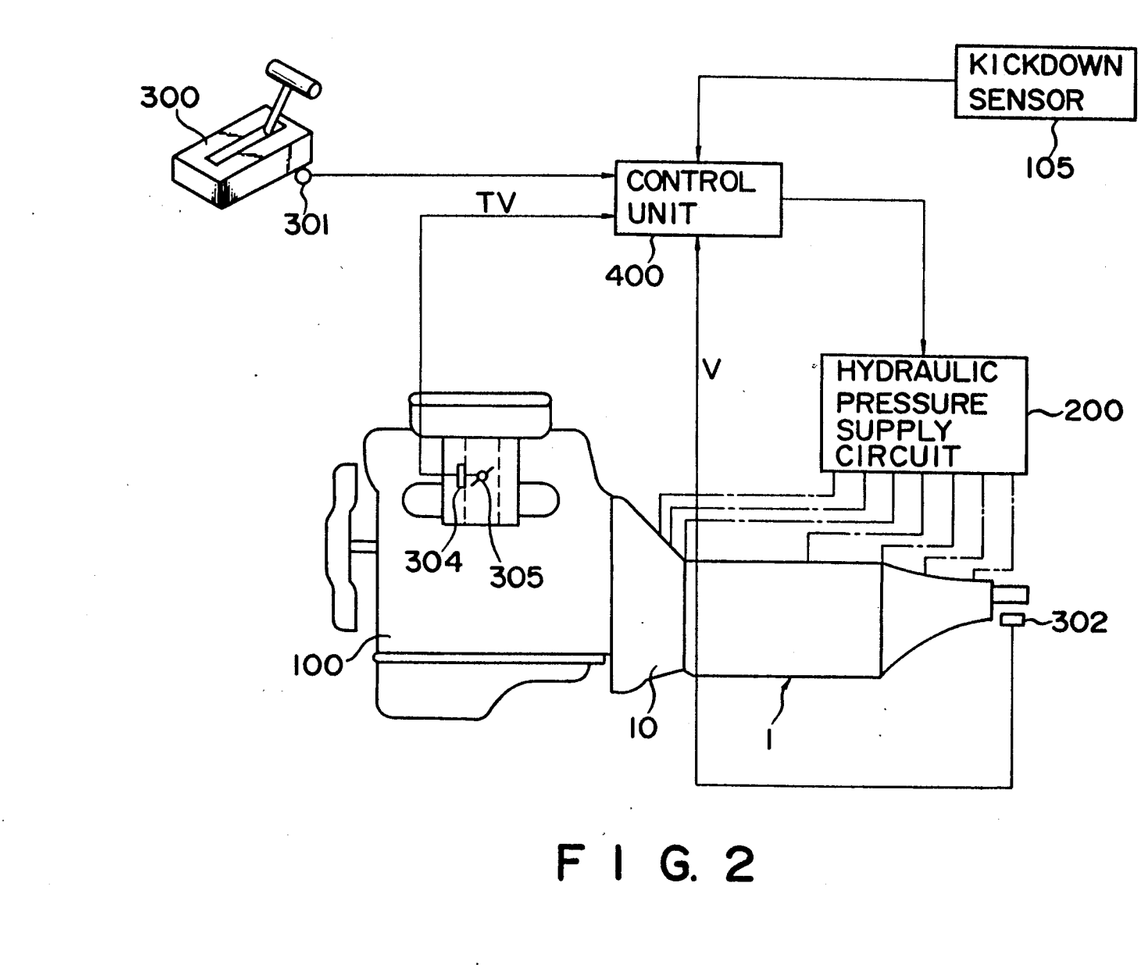
FIG. 2 is a block diagram showing the construction of a control system of an embodiment to which the present invention is applied to an automatic transmission.

FIG. 2 is a block diagram showing the construction of a control system for a transmission according to the embodiment. FIG. 3B is a diagram showing the construction of a fluid supply circuit 200, which is for supplying hydraulic pressure to each friction element in the automatic transmission, as well as the connection of these friction elements with the fluid supply circuit 200.

Overall, the control system comprises an engine 100, an automatic transmission 1, the fluid supply circuit 200, a torque converter 10, and a control apparatus 400.

The inputs to the control unit 400 are a detection signal received from an inhibitance switch 301 and indicating the selection position of a selector lever 300, a detection signal received from a sensor 105 and indicating that a kickdown operation performed by the driver has been detected, an opening signal received from a throttle-opening sensor 304 and indicating the opening of a throttle valve 305 of the engine 100, and a velocity signal from a velocity sensor 302 provided on the output shaft of the transmission 1.

Configuration of Automatic Transmission

Figure 3A:
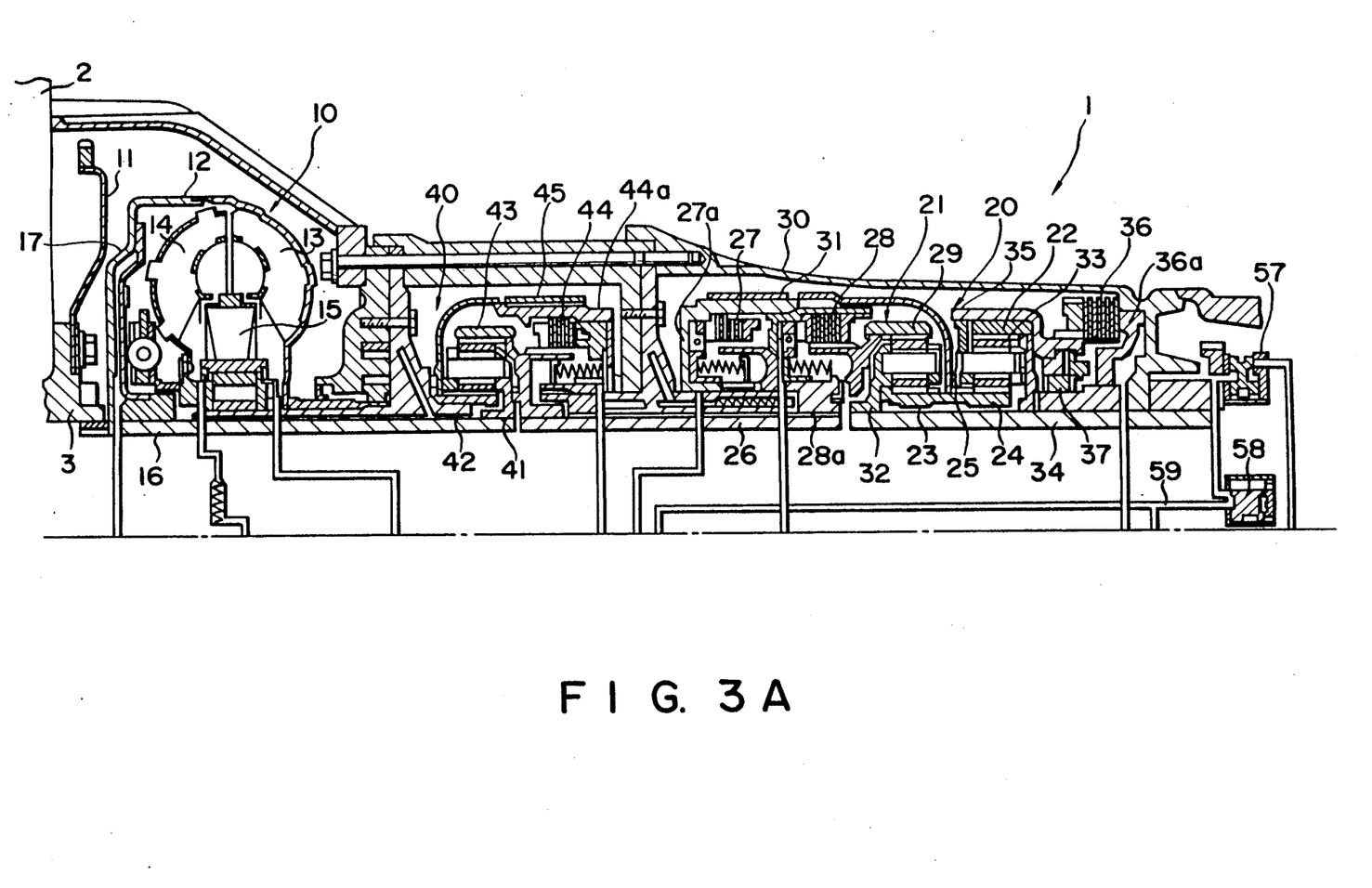
FIG. 3A is a sectional view illustrating the torque converter section, gear transmission section and lock-up section in an automatic transmission according to the embodiment.
Figure 3B:
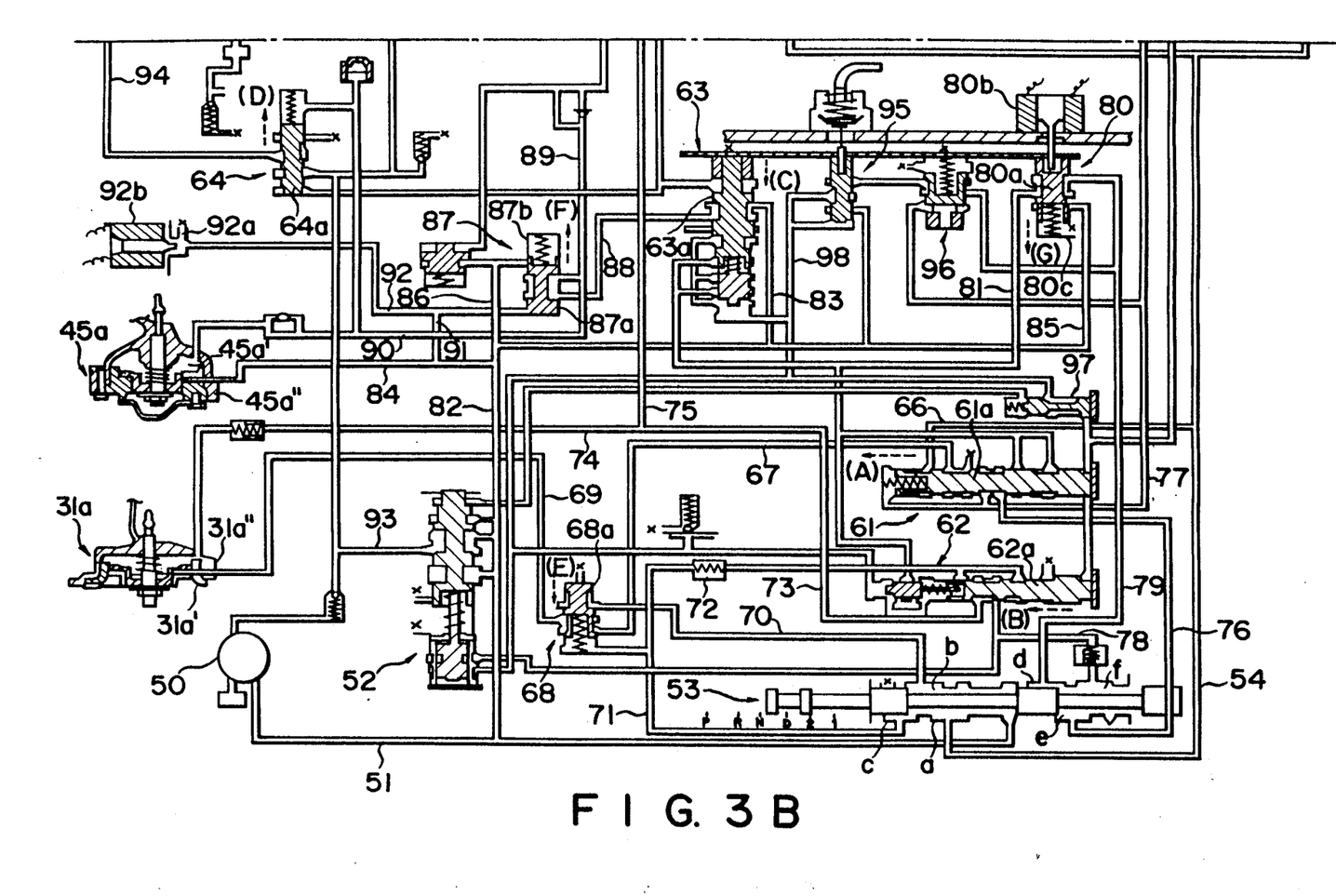
FIG. 3B is a block diagram showing the construction of a fluid supply circuit used in the embodiment.

FIGS. 3A and 3B illustrate the mechanical structure of the automatic transmission 1 and the construction of its fluid supply circuit 200. In the drawings, the automatic transmission 1 comprises the torque converter 10, a multiple-speed gear shift transmission mechanism 20, and a planetary gear shift transmission mechanism 40 for overdrive arranged between the torque converter 10 and the mechanism 20.

The torque converter 10 has a pump 13 directly coupled to an output shaft 3 of an engine 2 via a drive plate 11 and a case 12, a turbine 14 arranged inside the case 12 to oppose the pump 13, and a stator 15 arranged between the pump 13 and the turbine 14. An output shaft 16 is connected to the turbine 14. A lock-up clutch 17 is provided between the output shaft 16 and the case 12. The lock-up clutch 17 is urged in the locking direction at all times by the pressure of the working fluid circulating within the torque converter 10, and is released when a releasing hydraulic pressure is supplied from the outside.

The multiple-speed gear shift transmission mechanism 20 has a front planetary gear mechanism 21 and a rear planetary gear mechanism 22. These two mechanisms 21, 22 have respective sun gears 23, 24 interconnected by a connecting shaft 25. An input shaft 26 to the multiple-speed gear shift transmission mechanism 20 is connected to the connecting shaft 25 via a front clutch 27 and to a ring gear 29 of the front planetary gear mechanism 21 via a rear clutch 28. A second brake 31 is provided between the connecting shaft 25, namely the sun gears 23, 24 in the two planetary gear mechanisms 21, 22, and a transmission case 30. A pinion carrier 32 of the front planetary gear mechanism 21 and a ring gear 33 of the rear planetary gear mechanism 22 are connected by an output shaft 34. A low-reverse brake 36 and a one-way clutch 37 are interposed between a pinion carrier 35 of the rear planetary gear mechanism 22 and the transmission case 30.

The planetary gear shift transmission mechanism 40 for overdrive has a pinion carrier 41 connected to the output shaft 16 of the torque converter 10, a sun gear 42 and ring gear 43 connected by a high-gear clutch 44, and an overdrive brake 45 provided between the sun gear 42 and the transmission case 30. The ring gear 43 is connected to the input shaft 26 of the multiple-speed gear shift transmission mechanism 20.

In the multiple-speed gear shift transmission mechanism 20 thus constructed, the arrangement is such that three forward speeds and one reverse speed may be obtained between the input shaft 26 and the output shaft 34 by selectively operating the clutches 27, 28 and brakes 31, 36.

The planetary gear shift transmission mechanism 40 for overdrive is so adapted that the output shaft 16 of the torque converter 10 and the input shaft 26 of the multiple-speed gear shift transmission mechanism 20 are directly coupled when the clutch 44 is engaged and brake 45 released. The mechanism 40 is further so adapted that the shafts 16, 26 are connected for overdrive when the clutch 44 is disengaged and brake 45 engaged.

Fluid Supply Circuit

The fluid supply circuit for the abovementioned automatic transmission will now be described.

An oil pump 50 driven at all times by the engine output shaft 3 via the torque converter 10 discharges working fluid into a main line 51. The working fluid is introduced to a select valve 53 after its pressure is regulated by a pressure governor valve 52. The transmission 1 is set to have P, R, N, D, 2 and 1 ranges. The select valve 53 has operating positions corresponding to each of these ranges P, R, N, D, 2 and 1. The select valve 53 communicates the main line 51 to ports a, b, c in the D range, ports a, b, d in the 2 range, ports a, b, e in the 1 range, and ports d, e, f in the R range. Accordingly, in each of the forward ranges D, 2 and 1, the port a is in communication with the main line 51 at all times, and the working fluid is constantly supplied from the port a to an actuator 28a of the rear clutch 28 via a line 54, as a result of which the rear clutch 28 is held engaged at all times.

The working fluid from the port a of the select valve 53 or from line 54 is fed to a second governor valve 57 and a first governor valve 58 mounted on the output shaft 34 of the multiple-speed gear shift transmission mechanism 20. Due to the operation of these governor valves 57, 58, governor pressure corresponding to the rotational speed of the output shaft 34, namely velocity, is produced. This governor pressure is introduced to a 1-2 shift valve 61, a 2-3 shift valve 62, a 3-4 shift valve 63 and a lock-up valve 64 via a line 59, whereby spools 61a, 62a, 63a, 64a of respective ones of these valves are urged in directions A, B, C, D, respectively.

Numeral 95 denotes a vacuum-type valve (a "throttle pressure valve") for generating throttle pressure corresponding to the opening of the accelerator pedal (i.e., the opening of the throttle valve), namely engine load. The throttle pressure generated by the throttle pressure valve 95 is introduced to the 2-3 shift valve 62 and 3-4 shift valve 63 via line 98, whereby spools 62a, 63a of these valves 62, 63 are urged in opposite A, B and C directions against the force of the governor pressure. Accordingly, the shift valves 62, 63 are changed over in dependence upon the equilibrium relationship between governor pressure and throttle pressure introduced to these valves.

Further, port a of the select valve 53 is communicated with the 1-2 shift valve 61 via a line 66 branching from line 54. When the spool 61a is moved in the A direction by the governor pressure, port a is communicated with line 67 and, via a second lock valve 68, with line 69, whereby the working fluid is supplied to a locking-side port 31a' in an actuator 31a of the second brake 31 to lock the second brake 31. Accordingly, in the D range, working fluid is supplied from both ports b and c of the select valve 53 via lines 70, 71 so that the second lock valve 68 is held in a state in which the abovementioned lines 67, 69 are communicated, as illustrated in the drawing.

In the D range, the port c communicating with the main line 51 leads to the 2-3 shift valve 62 via the line 71 and a one-way throttle valve 72. When the spool 62a of the 2-3 shift valve 62 is moved in the B direction by governor pressure, the port c is communicated with line 73 and working fluid is branched to lines 74, 75 and supplied to a release port 31a" in the actuator 31a of the second brake 31 and an actuator 27a of the front clutch 27. As a result, the second brake 31 is released and the front clutch 27 is engaged.

The port c is closed when the select valve 53 is in the 2 range. As a result, spool 68a of the second lock valve 68 is moved in the E direction by the working fluid supplied from port b via line 70. By communicating the line 70 and line 69, the working fluid is supplied from port b to the locking port 31a' of the actuator 31a for the second brake via the lines 70, 69. In other words, the second brake 31 is locked irrespective of the state of the 1-2 shift valve 61 in the 2 range.

Further, in the 1 range and R range, line pressure 51 is introduced to the 1-2 shift valve 61 via the port e of the select valve 53 and line 76. When the spool 61a of the valve 61 is in the position illustrated, the line pressure is further introduced to the actuator 36a of the low-reverse brake 36 via line 77. As a result, the low-reverse brake 36 is locked in the 1 range and R range. In the R range, the pressure in main line 51 is introduced to the 2-3 shift valve 62 via port f and line 78. When the spool 62a of the valve 62 is in the position illustrated, the pressure is supplied to the release port 31a" of the actuator 31a for the second brake and to the actuator 27a for the front clutch 27 via line 73 and lines 74, 75, thereby engaging the front clutch 27. In this case, the second brake 31 is initially in the released state since the working fluid is not supplied to the locking port 31a' of the actuator 31a in the R range.

In the 2, 1 and R ranges, the line pressure in main line 51 is introduced, via port d and line 79, to a kickdown valve 80 which produces kickdown pressure. When a kickdown solenoid 80b is turned ON, a spool 80a of the kickdown valve 80 is moved in the G direction shown in the drawing. When the solenoid 80b is turned OFF, the spool 80a is held in the illustrated position by a spring 80c so that the line 79 is communicated with line 81. When the solenoid 80b is turned ON, the spool 80a is moved downwardly (in the G direction in the drawing) to communicate line 85 with line 81, thereby introducing kickdown pressure to the line 81. The latter reaches the 1-2 shift valve 61, 2-3 shift valve 62 and 3-4 shift valve 63. In the 2, 1 and R ranges, therefore, the working fluid is supplied in such a manner that the respective spools 61a, 62a, 63a of these shift valves are fixed at the positions illustrated.

FIG. 4 shows the manner in which the kickdown operation performed by the driver is detected. Specifically, the kickdown operation is detected by the kickdown detecting switch 105. At the time of a high load when an accelerator pedal 107 is open by more than 7/8 of a full-open value, by way of example, a lever portion 107a of the accelerator pedal 107 presses against the switch 105 and turns it ON, whereby the switch detects the kickdown operation.

Figure 6:
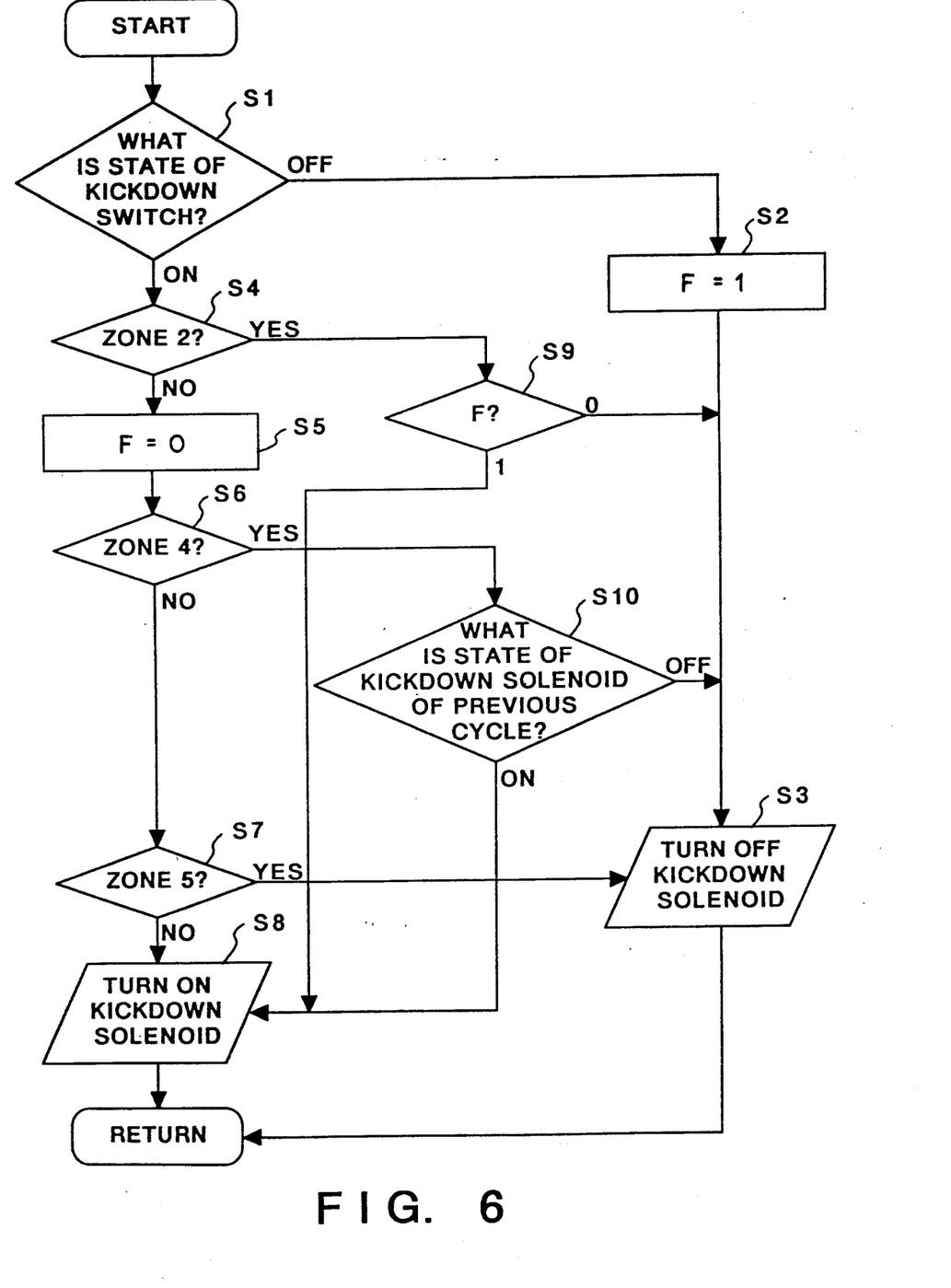
FIG. 6 is a flowchart showing ON/OFF control of a kickdown solenoid.

The ON/OFF state of the kickdown detecting switch 105 is applied to the control unit 400, which proceeds to execute control in accordance with the control procedure of the flowchart as shown in FIG. 6 and as described below.

As described earlier, the main line 51 has its course selectively changed over by the select valve 53. On the other hand, line pressure is introduced to the 3-4 shift valve 63, a locking port 45a' of an actuator 45a for the overdrive brake, the kickdown valve 80 and an overdrive cancelling valve 87 via a branch line 82 and lines 83, 84, 85, 86, etc., which branch from the line 82.

The pressure of line 83 introduced to the 3-4 shift brake 63 reaches the overdrive cancelling valve 87 via line 88 when the spool 63a of the valve 63 is in the position illustrated, and further reaches an actuator 44a of the high-gear clutch 44 and a release port 45a" of the actuator 45a for the overdrive brake through lines 89, 90 when a spool 87a of the valve 87 is in the position illustrated. Under these conditions, therefore, the high-gear clutch 44 is connected, while the overdrive brake 45 is released owing to supply of working fluid to both the locking and release ports 45a', 45a" of the actuator 54a. When the spool 63a of the 3-4 shift valve 63 is moved in the C direction by the abovementioned governor pressure, lines 83, 88 are cut off from each other, thereby halting the supply of working fluid to the actuator 44a for the high-gear clutch and the release port 45a" of the actuator 45a for overdrive. As a result, the high-gear clutch 44 is released and the overdrive brake 45 is locked.

The line 86 lead to the overdrive cancelling valve 87 ordinarily is closed off by the spool 87a of valve 87, as illustrated. However, when the spool 87a is moved in the F direction, the line 86 is communicated with line 89, 90 and the working fluid is supplied to the actuator 44a for the high-gear clutch and to release port 45a" of the actuator 45a for the overdrive brake. Consequently, the high-gear clutch 44 is engaged and the overdrive brake 45 is released.

The arrangement is such that the working fluid is supplied to one end of the spool 87a of the overdrive canceling valve 87 via the branch lines 82, 84 from the main line 51, an orifice 91 and a line 92. The line 92 ordinarily communicates with a drain port 92a, and the spool 87a is held in the illustrated position by a spring 87b. A downshift solenoid 92b is provided at the position of the drain port 92a. When the drain port 92a is closed by energizing the solenoid 92b, the hydraulic pressure in line 92 rises and the spool 87a is moved in the F direction. As a result, the high-gear clutch 44 is engaged and the overdrive brake 45 is released.

Furthermore, line 85 leading to the kickdown valve 80 from the branch line 82 of main line 51 ordinarily is closed off by spool 80a of valve 80. When the kickdown solenoid 80b turns ON, the spool 80a is moved in the G direction against the force of spring 80c, whereby line 85 is communicated with line 81. In the 2, 1 and R ranges, the line 81 supplies the working fluid in such a manner that the spools 61a, 62a, 63a of the 1-2 shift valve 61, 2-3 shift valve 62 and 3-4 shift valve 63 are fixed at the positions illustrated. In the D range, on the other hand, when the kickdown solenoid 80b turns ON and line 81 is communicated with line 85, the latter supplies the working fluid in such a manner that the spools 61a, 62a, 63a of the aforementioned shift valves are urged and returned to the positions illustrated. Whether or not these spools 61a, 62a, 63a have been urged back to their illustrated positions at this time depends upon a pressure relationship involving the governor pressure, which is urging these spools in the directions A, B and C, respectively.

A line 93 passing through the pressure governor valve 52 branches from the main line 51 and leads to the lock-up valve 64. When spool 64a of lockup valve 64 is in the position illustrated, line 93 supplies the working fluid into the torque converter 10 via a line 94, thereby repelling the lock-up clutch 17 within the torque converter 10. When the spool 64a of lock-up valve 64 is moved in the D direction owing to the relationship between the governor pressure from line 59 and the hydraulic pressure from line 90, the working fluid in line 94 is drained. As a result, the lock-up clutch 17 is locked by the hydraulic pressure inside the torque converter 10.

The fluid supply circuit 200 is equipped with a throttle back-up valve 96 which assists the vacuum throttle pressure valve 95, and a pressure modifier valve 97 for varying the pressure adjustment value decided by the pressure governor valve 52.

The following table illustrates the relationship between the transmission speeds and the operating states of the clutches 27, 28, 37, 44 and brakes 31, 36, 45 in the foregoing arrangement:

low, an understanding of how the zones are set is essential. Accordingly, how the velocity zones of FIG. 5 are set will now be described.

Figure 5:
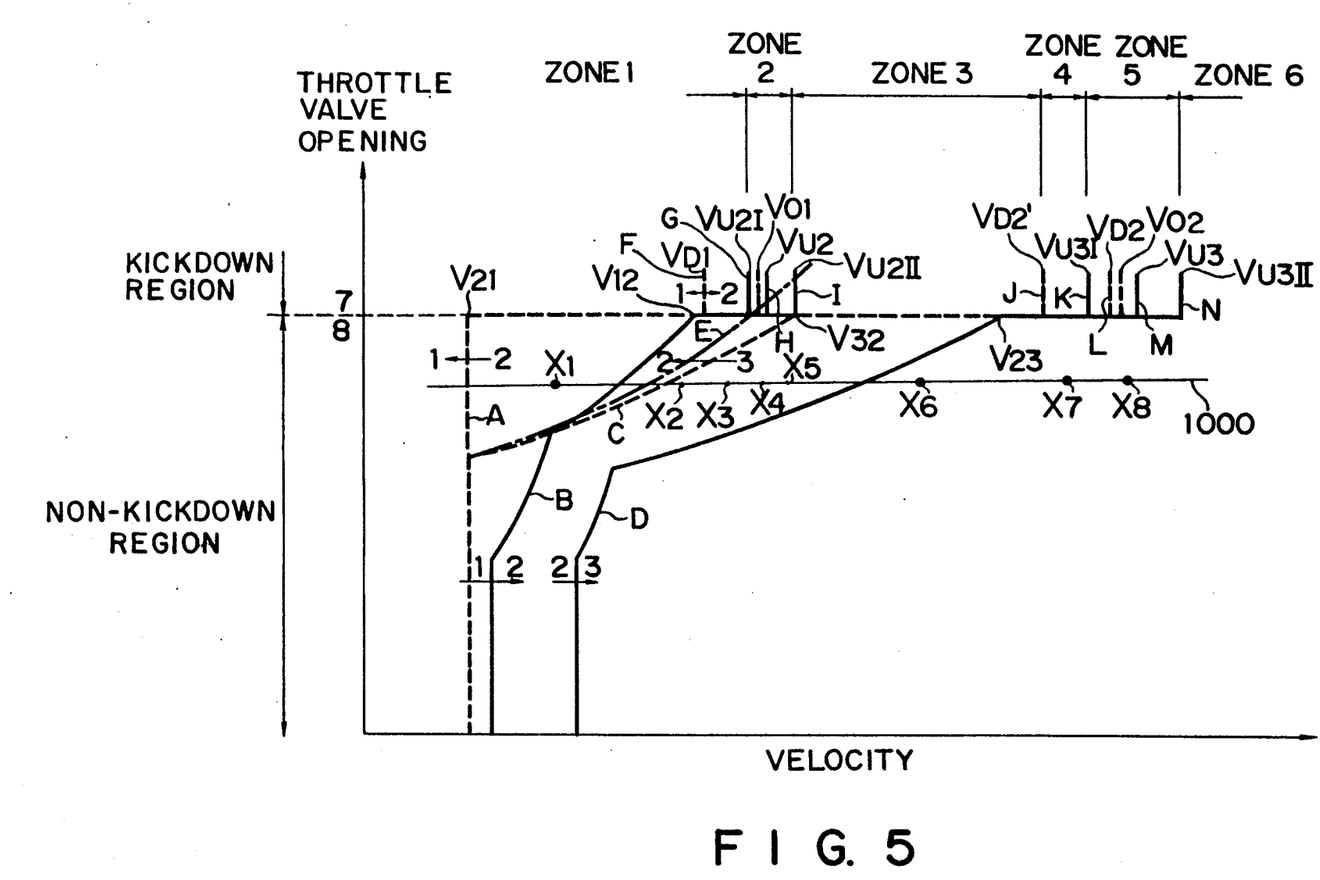
FIG. 5 is a diagram for describing the relationship of velocity zones to shift lines used in control according to the embodiment.

To simplify the drawing, a 3→4 upshift line and a 4→3 downshift line are deleted from FIG. 5.

FIG. 5 is a graph for describing the manner in which the velocity zones used in shift control performed by the control apparatus of the embodiment are set. Lines A through N shown in the graph indicate the relationship between velocity and throttle valve opening when each shift valve is operated to change over the transmission speed in accordance with the relationship between governor pressure and throttle pressure. In the shift diagram of FIG. 5, a throttle valve opening region in which the opening is greater than ⅞ of full open (this region will be referred to as a "kickdown region" hereinafter) is a high-load region in which the kickdown detecting switch 105 is turned ON. A throttle valve opening region in which the opening, which is outside the kickdown region, ranges from 0° to less than ⅞ of full open is referred to as a "non-kickdown region" hereinafter.

For the sake of convenience, FIG. 5 shows only the shift lines in the D range. The reason for this is that control according to the present invention can be understood fully from a description of the velocity zones in the D range.

In FIG. 5, the shift lines A, B, C and D are a 2→1 downshift line, a 1→2 upshift line, a 3→2 downshift line and a 2→3 upshift line, respectively, in the non-kickdown region. That is, these are shift lines which prevail during ordinary travel in which the kickdown operation is not being performed by the driver. Maximum velocity at which a shift is made from 2nd speed to 1st speed in accordance with the 2→1 downshift line is represented by $V_{21}$, maximum velocity at which a shift is made from 3rd speed to 2nd speed in accordance with the 3→2 downshift line is represented by $V_{32}$, maximum velocity at which a shift is made from 1st speed to 2nd

TABLE

| | FRONT CLUTCH 27 | REAR CLUTCH 28 | SECOND BRAKE 31 | LOW-REVERSE BRAKE 36 | ONEWAY CLUTCH 37 | HIGH-GEAR CLUTCH 44 | OVER-DRIVE BRAKE 45 |
|---|---|---|---|---|---|---|---|
| P | | | | | | O | |
| R | O | | | O | | O | |
| N | | | | | | O | |
| D | | | | | | | |
| 1st | | O | | | O | O | |
| 2nd | | O | O | | | O | |
| 3rd | O | O | | | | O | |
| 4th | O | O | | | | | O |
| 2 | | O | O | | | O | |
| 1 | | | | | | | |
| 1st | | O | | O | | O | |
| 2nd | | O | O | | | O | |

Control Operation at Kickdown

In order to attain the object of the invention, namely overrun prevention at the time of kickdown during travel in low gear as well as a reliable kickdown operation during travel in high gear, the control system of FIG. 2 is such that velocity zones (zone 1 through zone 6) of the kind shown in FIG. 5 are set, whereupon the system controls the kickdown valve 80 in dependence upon the particular zone in which velocity presently resides in the control procedure of the control system, which is shown in FIG. 6. Therefore, in order to gain an understanding of the control procedure described bespeed in accordance with the 1→2 upshift line is represented by $V_{12}$, and maximum velocity at which a shift is made from 2nd speed to 3rd speed in accordance with the 2→3 upshift line is represented by $V_{23}$. A shift line E in the non-kickdown region indicates a case where the 3→2 downshift line C is displaced toward the high-load side by structural variance of the 2-3 shift valve. It will become clear that the control system of the present embodiment is capable of dealing with such structural variance.

The kickdown region of FIG. 5 will now be described.

The kickdown valve 80 is controlled by the control unit 400. If the kickdown valve 80 is turned on so that kickdown pressure is produced in line 81 and introduced to the shift valves 61 through 63, the kickdown pressure opposes the governor pressure and the shift timing of the shift valves 61 through 63 moves toward the high-velocity side. This is as already described in relation to the operation of the supply circuit shown in FIG. 3B. In FIG. 5, the velocities at the shift points following this movement of shift timing are represented by $V_{D1}$, $V_{U2}$, $V_{D2}$, $V_{U3}$, respectively. More specifically, if the kickdown valve 80 is turned on, then, in the kickdown region, velocity at which a downshift from 2nd speed to 1st speed occurs is $V_{D1}$, velocity at which an upshift from 1st speed to 2nd speed occurs is $V_{U2}$, velocity at which a downshift from 3rd speed to 2nd speed occurs is $V_{D2}$, and velocity at which an upshift from 2nd speed to 3rd speed occurs is $V_{U3}$. It should be noted that even when the throttle valve opening is in the kickdown region, a shift will take place in accordance with the usual shift lines (e.g., A, B), and not in accordance with the shift lines (e.g., F, H) of the kickdown region, as long as the kickdown solenoid 80b is not turned on. This is because the kickdown solenoid 80b is, in the last, finally controlled by the controller. By way of example, even if the kickdown switch 105 is turned on during travel in 3rd speed so that, in apparent terms, the throttle valve opening enters the kickdown region, and furthermore, even if the velocity V at this time is as follows:

$$V_{23} < V < V_{D2}$$

no downshift to 2nd speed is made. Instead, the controller 400 decides whether to turn the solenoid 80b on or off upon considering other factors, particularly the manner in which the velocity has made a transition through the velocity zones.

In the graph of FIG. 5, an engine overrun point in 1st speed is expressed as $V_{o1}$ in terms of velocity, and an engine overrun point in 2nd speed is expressed as $V_{o2}$ in terms of velocity. These overrun velocities $V_{o1}$, $V_{o2}$ are decided by the relationship between the engine and the transmission gear mechanism. In addition, the downshift velocities $V_{D1}$, $V_{D2}$ and upshift velocities $V_{U2}$, $V_{U3}$ are decided by the characteristics of the shift valves. Accordingly, though $V_{o1}$, $V_{o2}$ and $V_{D1}$, $V_{D2}$, $V_{U2}$ and $V_{U3}$ are used as information for shift control, they themselves are not subjected to control. Therefore, in order to prevent overrun due to the increase in vehicle velocity during the kickdown control as well as a reliable kickdown operation where a real kickdown operation is required, in accordance with the present embodiment, first the velocity zones of the kind shown in FIG. 5, which are decided based on $V_{o1}$, $V_{o2}$ and $V_{D1}$, $V_{D2}$, $V_{U2}$, $V_{U3}$, are set, then the on/off action of the kickdown solenoid 80b is controlled taking into consideration which zone the present velocity resides in and through which zone the velocity has made a transition.

In FIG. 5, the shift point of the 1→2 upshift line H in the kickdown region is the velocity $V_{U2}$. The velocity $V_{U2}$ is decided by the characteristic of the 1-2 shift valve 61. Assume that the velocity $V_{U2}$ is one which exceeds the velocity $V_{o1}$ corresponding to the engine overrun point in 1st speed. With a system having a shift valve possessing this characteristic, the upshift from 1st to 2nd speed must take place at a velocity lower than the overrun velocity $V_{o1}$ in the kickdown region. If the velocity at the 1st-to-2nd speed upshift point is expressed by $V_{U2I}$, then $V_{U2I}$ must be less than the overrun velocity $V_{o1}$ and greater than $V_{D1}$. In other words, $V_{D1} < V_{U2I} < V_{o1}$ must hold. Accordingly, in case where the control enters the kickdown region at a vehicle velocity lower than $V_{U2I}$ which is a 1→2 upshift point, and the vehicle velocity is increasing, an upshift operation will be made at $V_{U2I}$, namely the boundary velocity between zones 1 and 2, by turning off the kickdown solenoid 80b.

The foregoing is a description of the manner in which $V_{U2I}$, namely the boundary between zone 1 and zone 2, is set for the purpose of performing an upshift while so controlling the kickdown solenoid 80b that the engine will not overrun in a case where the driver performs the kickdown operation in a comparatively low gear.

The setting of VU2II, namely the boundary between zones 2 and 3, will now be described.

In general, a downshift line is set to be on the lower velocity side of an upshift line. Consequently, there are cases where the kickdown operation is performed while the vehicle is traveling in 3rd speed through the region on the right-hand side of the 3→2 downshift line. An instance in which the kickdown operation is performed in this region is when the driver judges that acceleration in the present speed is insufficient. Accordingly, a downshift should be made from 3rd speed to 2nd speed by turning on the kickdown solenoid 80b and changing the 3→2 downshift line from line C to line L. The velocity Vu2II which is the boundary between zone 2 and zone 3 is decided according to the following viewpoint: Specifically, in a case where the vehicle velocity is increased from zone 1 to zone 2 in the kickdown region, the 1st to 2nd upshift is made at the velocity $V_{U2I}$ which is a changeover point from zone 1 to zone 2, as has been described before. If the vehicle velocity keeps increasing it will enter zone 3 while the vehicle is still travelling in 2nd speed. The zone 3 is such a region where a shift down operation to 2nd speed is preferably made in a case that the vehicle velocity enters the zone 3 at the 3rd speed. Therefore, the kickdown solenoid 80b may be off in the case that the velocity enters the zone 3 with 2nd speed as well as in a case for zone 2. However, if the solenoid would be kept off, a 2nd to 3rd upshift would be made, which is not preferable, at the maximum velocity $V_{23}$ of 2→3 upshift line D which is applied for a case where the solenoid 80b is not operated. In order to prevent the foregoing disadvantage, in case where the vehicle velocity enters zone 3 with 3rd speed kept from zone 2 following zone 1, it is necessary to change the solenoid 80b from the on-state to off-state at least at the vehicle velocity $V_{23}$ so that a 2→3 upshift might not be made until the velocity $V_{U3I}$ which is higher than $V_{23}$.

Furthermore, the vehicle velocity $V_{U2II}$ is higher than at least $V_{U2I}$. Thus, the boundary velocities $V_{U2I}$ and $V_{u2II}$ between the prescribed zones are important because they prevent the overrun of the engine, in a case where a load is increased at a low gear speed, the control enters the kickdown region and then the vehicle velocity keeps increasing.

Meanwhile, the solenoid 80b is controlled to be activated for a case where the control enters immediately zone 2 or 3 which follows the increase of the load. This has no direct relationship with how the value of VU2II should be set.

Next, a case where the control enters immediately zone 2 which follows the increase of engine load, for such a case, a 3→2 downshift ought to be made because the vehicle velocity traverses 3→2 downshift line C (as shown in FIG. 5) and the control enters the kickdown region. If a downshift to 2nd is normally made, it would not be necessary to particularly energize the solenoid 80b. Accordingly, the solenoid 80b might be off at a velocity higher than $V_{U2I}$ when zone 2 is directly entered into as well as when zone 2 is entered from zone 1. It should be noted, however, that shift valves differ from one to another. For example, the 2-3 shift valve can have the characteristic of shift line C or that of shift line E. If the shift valves have the characteristic of line E and even if the throttle opening exceeds seven-eighths ($\frac{7}{8}$) and zone 2 is entered into, it is probable that a downshift operation does not occur because the line E is not traversed. This might cause a problem. In order to prevent this disadvantage, the present apparatus which controls the solenoid 80b is to be activated when zone 2 is directly entered into.

Further, velocities $V_{U3I}$ and $V_{U3II}$ are set as shown in FIG. 5 in order to control overrun prevention when the kickdown operation is performed during travel in a high-speed region, and to control reliable execution of the kickdown operation in this region. A 2→3 upshift line M has a shift point at the velocity $V_{U3}$, and the velocity $V_{U3}$ exceeds the velocity $V_{o2}$ corresponding to the engine overrun point in 2nd speed. Therefore, from a point of view similar to that in the case of $V_{U2I}$, the setting is made as follows:

$$V_{23} < V_{U3I} < V_{o2}$$

In other words, $V_{U3I}$ is the boundary between zone 4 and zone 5. A 3→4 shift line and 4→3 shift line are deleted from FIG. 5, as described above. In actuality, however, there is a velocity $V_{34}$ at which a 3→4 upshift occurs when the kickdown solenoid 80b is not turned on. Accordingly, $V_{U3II}$ is set so as to satisfy the inequality $$V_{U3} < V_{U3II} < V_{D3}$$

from the same viewpoint as was taken in the case of $V_{U2II}$. The velocity $V_{U3II}$ is the boundary between zone 5 and zone 6.

For the sake of convenience, $V_{U2I}$ and $V_{U3I}$ are each referred to as a "first velocity", and $V_{U2II}$ and $V_{U3II}$ each referred to as a "second velocity". $V_{U2I}$ and $V_{U2II}$ are used in kickdown control in a low-velocity region, and $V_{U3I}$ and $V_{U3II}$ are used in kickdown control in a high-velocity region.

Furthermore, $V_{D2'}$ is provided at the boundary between zone 3 and zone 4 in FIG. 5. This is provided in order to prevent hunting in the shift between 2nd and 3rd speeds that could occur because the maximum velocity $V_{D2}$ at which the downshift to 2nd speed can be made is higher than the minimum velocity $V_{U3I}$ at which the upshift to 3rd speed can be made. A detailed description of this will be made in connection with the control procedure.

Control Procedure

Reference will be had to the control flow of FIG. 6 to describe ON/OFF control of the kickdown solenoid 80b under a high load in excess of the $\frac{7}{8}$ opening required for kickdown. As mentioned above, the regions in FIG. 5 are referred to as follows:

region where $V < V_{U2I}$ holds: zone 1
region where $V_{U2I} \leq V < V_{U2II}$ holds: zone 2
region where $V_{U2II} \leq V < V_{D2'}$ holds: zone 3
region where $V_{D2'} \leq V < V_{U3I}$ holds: zone 4
region where $V_{U3I} \leq V < V_{U3II}$ holds: zone 5
region where $V_{U3II} \leq V$ holds: zone 6

The control unit 400 has several control programs for automatic shift control in addition to the control procedure of FIG. 6. The control program shown in FIG. 6 is a subroutine called periodically by a main routine (not shown), which is one of the control programs of control unit 400.

First, at step S1 in FIG. 6, the ON/OFF state of the kickdown detecting switch 105 is discriminated.

WHEN SWITCH 105 IS NOT BEING PRESSED

In a case where kickdown is not required, which is that when the switch 105 is OFF, a flag F is set to F=1 at step S2, after which the kickdown solenoid 80b is turned off at step S3 to return to the main routine and end the control procedure of FIG. 6.

WHEN SWITCH 105 IS PRESSED

A case where the kickdown detecting switch 105 is judged to be ON at step S1, namely a case where the driver has depressed the accelerator pedal by a large amount to demand kickdown, will be described below.

In FIG. 5, points $X_1$ through $X_8$ on an imaginary line 1000 indicate points in time at which the driver performs the kickdown operation. Let $V_{X1}$ represent the velocity at time $X_1$, by way of example. Accordingly, when control for the case where switch 105 is pressed is described, first control at kickdown at time $X_1$ will be described, then control at kickdown at time $X_2$, and so on in order up to time $X_8$.

Kickdown at $X_1$ in 1st speed

Kickdown performed at time $X_1$ in 1st speed is an instance where the driver has demanded further acceleration and therefore has performed the kickdown operation while velocity is rising in zone 1, in which 1st speed is being used. Since a further downshift from 1st speed obviously is not possible in response to the downshift request during travel in 1st speed, an upshift from 1st to 2nd speed will occur.

In a case where the vehicle is traveling in zone 1 in 1st speed, the program proceeds from step S1 to step S4, at which it is determined if it is in zone 2 or not. Since it is now not in zone 2 the control proceeds to step S5, at which the flag F is set to F=0. By thus resetting the flag F, a change from a low-load state to a high-load state is indicated. Control for turning the kickdown solenoid 80b ON is executed through steps S6, S7 and S8. By thus turning on the solenoid, kickdown pressure is introduced to each shift valve, whereby the 1→2 upshift line moves from line B to line H on the high-velocity side. Similarly, the 2→1 downshift line moves from line A to line F on the high-velocity side.

Engine output is increased by stepping down on the accelerator pedal 107 until the kickdown switch 105 is turned on. Though a balance between engine output and load is attained, velocity will rise and head toward zone 2. Velocity $V_{U2I}$ eventually will be attained and zone 2 penetrated.

When velocity enters zone 2, the control steps executed are S1, S4 and S9. Since the flag F will have been reset at step S5, the program proceeds from step S9 to step S3. Control is executed to turn the kickdown solenoid 80b OFF at step S3. As a result, kickdown pressure is introduced to line 81 and the 1-2 shift valve 61 performs a shift operation in accordance with the shift line B of the non-kickdown region. In other words, when the conditions are such that this shift valve follows the 1→2 shift line B at the moment that velocity reaches $V_{U2I}$, the transmission speed is upshifted from 1st to 2nd speed because the inequality $$V_{12} < V_{U2I}$$

holds. That is, overrun is prevented by upshifting the transmission beforehand at $V_{U2I}$ before the overrun velocity $V_{o1}$ in 1st speed is reached.

On the one hand, when the velocity resides in zone 1, the kickdown solenoid 80b is maintained in the ON state through execution of steps S1, S4, S5, S6, S7 and S8.

On the other hand, in a case where the present velocity cannot be maintained but instead declines even when there is an upshift to 2nd speed, the velocity eventually reaches zone 1 and then $V_{D1}$, at which instant a downshift is made to 1st speed. More specifically, turning on the kickdown solenoid 80b establishes the downshift line F, which is set on the higher velocity side of the usual 2→1 downshift line A (i.e., $V_{21} < V_{D1}$). As a result, the downshift to 1st speed is made on the higher velocity side. This makes it possible to obtain a torque characteristic which promptly conforms to the kickdown request made by the driver.

Kickdown at $X_1$ in 2nd speed

Execution of kickdown at time $X_1$ while the vehicle is traveling in 2nd speed means that the driver has performed the kickdown operation because velocity is tending to decrease and the driver does not wait for the velocity to decline to $V_{21}$ on the 2→1 downshift line A. In such case, the downshift should be performed immediately.

Control proceeds through steps S1, S4, S5, S6, S7 and S8 because the vehicle is traveling in zone 1. The kickdown solenoid 80b is turned on at step S8 so that the 2→1 shift line is moved from line A to $V_{D1}$. Since the inequality $V_{X1} < V_{D1}$ holds, the result of this operation is that the transmission is downshifted from 2nd to 1st speed to complete the kickdown operation.

Kickdown at $X_2$ ($<V_{U2I}$) in 2nd speed

Execution of kickdown at time $X_2$ while the vehicle is traveling in 2nd speed means that the driver has performed the kickdown operation because he desires further acceleration even though velocity is tending to rise in zone 1.

In this case, since the velocity is in zone 1, control proceeds through steps S1, S4, S5, S6, S7 and S8. The kickdown solenoid 80b is turned on at step S8 to move the 2→1 shift line from line A to $V_{D1}$. Since the inequality $V_{X2} < V_{D1}$ holds, the result of this operation is that the transmission is downshifted from 2nd to 1st speed to complete the kickdown operation. Downshift should take place immediately.

Kickdown at $X_2$ ($<V_{U2I}$) in 3rd speed

Execution of kickdown at time $X_2$ while the vehicle is traveling in 3rd speed means that the driver has performed the kickdown operation because velocity is tending to decrease and the driver does not wait for the velocity to decline to $V_{32}$ on the 3→2 downshift line C. In such case, the downshift should be performed immediately.

In this case, since the velocity is in zone 1, control proceeds through steps S1, S4, S5, S6, S7 and S8. The kickdown solenoid 80b is turned on at step S8 to move the 3→2 shift line from line C to $V_{D2}$. Since the inequality $V_{X2} < V_{D2}$ holds, the result of this operation is that the transmission is downshifted from 3rd to 2nd speed to complete the kickdown operation.

If the decrease in velocity does not cease despite the downshift to 2nd speed and the driver continues to step down on the accelerator pedal, a further downshift to 1st speed will take place at the moment velocity reaches $V_{D1}$.

Kickdown at $X_3$ ($<V_{U2I}$) in 2nd speed

Execution of kickdown at time $X_3$ ($V_{D1} < V_{X3} V_{U2I}$) while the vehicle is traveling in 2nd speed in zone 1 means that the driver has performed the kickdown operation because he desires further acceleration even though velocity is tending to rise.

Since the vehicle is traveling in zone 1, control proceeds through steps S1, S4, S5, S6, S7 and S8. The kickdown solenoid 80b is turned on at step S8. However, since the inequality $V_{D1} < V_{X3}$ holds, no downshift is made.

Kickdown at $X_3$ ($<V_{U2I}$) in 3rd speed

Execution of kickdown at time $X_3$ ($V_{D1} < V_{X3} V_{U2I}$) while the vehicle is traveling in 3rd speed in zone 1 means that the driver has performed the kickdown operation because velocity is tending to decrease and the driver does not wait for the velocity to decline to $V_{32}$ on the 3→2 downshift line C. In such case, the downshift should be performed immediately.

Since the vehicle is traveling in zone 1, control proceeds through steps S1, S4, S5, S6, S7 and S8. The kickdown solenoid 80b is turned on at step S8. Since the inequality $V_{X2} < V_{D2}$ holds, the result of this operation is that the transmission is downshifted to 2nd speed.

Kickdown at $X_4$ ($V_{U2I} < V_{X4} < V_{U2}$) in 2nd speed $X_4$ ($V_{U2I} < V_{X4} < V_{U2}$) is the region of zone 2. Execution of kickdown at time $X_4$ while the vehicle is traveling in 2nd speed in zone 2 means that the driver has performed the kickdown operation because he desires further acceleration even though velocity is tending to rise.

Since the vehicle is traveling in zone 2, control proceeds through steps S1, S4 and S9. Whether the flag F has been set or not is checked at step S9. Turning on the kickdown switch 105 for the first time while the vehicle is traveling in zone 2 means that the flag F should have been set at step S2 of the preceding cycle. Accordingly, the program proceeds from step S9 to step S8, where the kickdown solenoid 80b is turned on. However, since $V_{X4} > V_{D1}$ holds, no downshift is made.

Kickdown at $X_4$ ($V_{U2I} < V_{X4} < V_{U2}$) in 3rd speed

When kickdown is performed for the first time at time $X_4$ while the vehicle is traveling in 3rd speed in zone 2, control proceeds through steps S1, S4 and S9 since the vehicle is traveling in zone 2. Since the flag F has been set, the program proceeds from S9 to step S8, where the kickdown solenoid 80b is turned on. When this is done, a downshift is made from 3rd to 2nd speed since the inequality $V_{X4} < V_{D2}$ holds.

The function of flag F should be clear from the description thus far. Specifically, if there is a transition from zone 1 to zone 2 in a case where the driver performs the kickdown operation for the first time in zone 1, the kickdown solenoid 80b is forcibly turned off, at the moment velocity enters zone 2, in accordance with the state (F=0) of flag F in such a manner that the velocity will not reach the overrun velocity $V_{o1}$ while the transmission remains in 1st speed. This is the purpose of flag F. It should be noted that the 1st-speed state is not possible, namely that the transmission is either in 2nd speed or 3rd speed, when the velocity is in zone 2 during ordinary travel. Accordingly, in a case where the driver performs kickdown for the first time in zone 2, F=1 will hold and therefore no problems will be encountered even though control proceeds from step S9 to step S8 to turn on the kickdown solenoid 80b.

Kickdown at $X_5$ ($V_{U2} < V_{X5} < V_{U2II}$) in 2nd speed

In this case, the vehicle is traveling while velocity is rising in zone 2. Control proceeds through steps S1, S4 and S9. Since flag F will have been set, the program proceeds from step S9 to step S8 to turn on the kickdown solenoid 80b. Since $V_{X5} > V_{D1}$ holds, however, no downshift is performed.

Kickdown at $X_5$ ($V_{U2} < V_{X5} < V_{U2II}$) in 3rd speed

In this case, control proceeds through steps S1, S4, S9 and S8, so that the kickdown solenoid 80b is turned on. Since $V_{X5} < V_{D2}$ holds, a downshift to 2nd speed is performed.

Kickdown at $X_6$ ($V_{U2II} < V_{X6} < V_{23}$) in 3rd speed

This is a case in which the vehicle is traveling in 3rd speed in zone 3. When the driver performs the kickdown operation for the first time, control proceeds through steps S1, S4, S5, S6, S7 and S8 to turn on the kickdown solenoid 80b. Since $V_{X6} < V_{D2}$ holds, a downshift from 3rd speed to 2nd speed is performed.

A case in which velocity rises at the moment the downshift to 2nd speed is made will now be described. The velocity enters zone 4 at this time. When this takes place, the program proceeds from step S6 to step S10, at which the state of the kickdown solenoid 80b that prevailed in the previous cycle is checked. In the present example, the kickdown solenoid 80b will be on and therefore the program proceeds to step S8, at which the ON state of the kickdown solenoid 80b is maintained.

By downshifting to 2nd speed, the velocity enters zone 5 if it is still rising. At this time, the program proceeds from step S7 to step S3 to turn off the kickdown solenoid 80b. In other words, the shift line is forcibly returned to the ordinary shift line irrespective of the fact that the kickdown operation is as yet being carried out. Since the velocity which has entered zone 5 is one at which an upshift must be made in accordance with the 2→3 upshift line D, the transmission is upshifted to 3rd speed. By virtue of this control, the velocity is prevented from reaching the overrun velocity $V_{o2}$ with the transmission left in 2nd speed.

Kickdown at $X_7$ ($V_{23} < V_{X7} < V_{D2'}$) in 3rd speed

In this case, the vehicle is traveling in 3rd speed. Control proceeds through steps S1, S4, S5, S6, and S10, at which the state of the kickdown solenoid 80b is checked. Since the solenoid was OFF in the previous cycle, the program proceeds to step S3 and the kickdown solenoid 80b is maintained in the OFF state. In other words, no downshift is made.

Since there is no downshift, velocity declines and falls to zone 3. When this occurs, control proceeds through steps S1, S4, S5, S6, S7 and S8, so that the kickdown solenoid 80b is turned ON and a downshift is made to 2nd speed. Owing to the downshift, velocity rises and returns to zone 4. Now the program proceeds from step S6 to step S10 and the kickdown solenoid 80b is held in the ON state.

Owing to the presence of step S10, control for when velocity makes a transition from zone 3 to zone 4 differs from that for when kickdown is started in zone 4. This difference in control is concerned with the reason for setting zone 4. If zone 4, i.e., $V_{D2'}$, were not set, zones 3 and 5 would be adjacent to each other. The reason for the existence of zones 2 and 5 is to turn off the solenoid valve 80b so that velocity will not attain the overrun velocities $V_{o1}$, $V_{o2}$ in first and second speed, respectively. $V_{D1}$ is the maximum velocity at which a downshift can be made to 1st speed, and $V_{U2I}$ is the minimum velocity at which an upshift can be made to 2nd speed. On the other hand, $V_{D2}$ is the maximum velocity at which a downshift can be made to 2nd speed. If zone 4 were non-existent, $V_{U3I}$, which is the boundary between zones 3 and 5, would be the minimum velocity at which an upshift could be made to 3rd speed. However, $V_{U3I} < V_{D2}$ holds as opposed to $V_{D1} < V_{U2I}$. Accordingly, for such a case as this, an abnormal travelling status would occur in which while a 2nd→3rd upshift is made because the velocity exceeds $V_{U3I}$, a 3rd→2nd downshift will occur because it is lower than $V_{D2}$.

In order to prevent the disadvantage, according to the present embodiment, the maximum vehicle velocity at which a downshift to 2nd can be made is changed from $V_{D2}$ to $V_{D2'}$, which is lower than $v_{U3I}$. Furthermore, in the present apparatus, a 3→2 downshift occurs at velocities lower than $V_{D2'}$ and a 3→2 downshift does not occur in a velocity region higher than $V_{D2'}$. For this reason, even if zone 4 is directly entered into due to the increase of the load, the 3→2 downshift is not preferred because of $V_{X7} > V_{D2'}$, where $V_{X7}$ is a vehicle velocity at that time. Accordingly, the kickdown solenoid 80b is controlled not to be energized for the case where zone 4 is directly entered into. If 3→2 downshift was allowed for the case where zone 4 is directly entered into, the vehicle velocity would immediately increase after the shift down operation, which would result in an immediate occurrence of another 2→3 shiftup. Thus, shift down and shiftup operations repeatedly occur between 2nd speed and 3rd speed, which is not preferable. From this viewpoint too, the present apparatus controls to prevent the 3→2 downshift operation for the case where zone 4 is directly entered into.

Kickdown at $X_8$ ($V_{D2} < V_{X8} < V_{o2}$) in 3rd speed

X8 is in zone 5. Accordingly, control proceeds from step S7 to step S3, whereby the kickdown solenoid 80b is turned OFF. As a result, no downshift is made.

The difference in character between zone 2 that includes the overrun velocity $V_{o1}$ and zone 5 that includes the overrun velocity $V_{o2}$ will now be described. When there is a transition from zone 1 to zone 2 in response to the kickdown operation performed by the driver, the kickdown solenoid 80b is forcibly turned off (it is determined that F=0 holds at step S9) at the moment velocity enters zone 2. However, when the kickdown operation is performed for the first time while the vehicle is traveling in zone 2, F=1 will be the determination made at step S9 and, hence, the kickdown solenoid 80b is turned on. In zone 5, on the other hand, the kickdown solenoid 80b is turned off indiscriminately even when velocity enters zone 5 from zone 4 and even when the kickdown operation is performed for the first time with the velocity residing in zone 5. This difference in control between zone 2 and zone 5 is based on the consideration that $V_{D2}$ and $V_{o2}$ in zone 5 are very close together in the shift characteristic, which is shown in FIG. 5, of the fluid supply circuit 200 used in the present embodiment. More specifically, if the velocity $V_{U3I}$ at which 2→3 upshift occurs is set to a lower value than $V_{o2}$, it is lower than $V_{D2}$. Setting $V_{U3I}$ to such a value as the above prevents the vehicle from reaching an overrun velocity with the second speed kept, by deenergizing the solenoid 80b and a 2→3 upshift operation at velocities higher than $V_{U3I}$.

Nevertheless, if the kickdown solenoid 80b is controlled to operate for a case the kickdown region is immediately entered into at vehicle velocities from $V_{U3I}$ to $V_{D2}$, a 3→2 downshift operation would occur and then an overrun condition ($>V_{o2}$) would result due to the increase of the vehicle velocity. According to the present apparatus, the kickdown solenoid 80b is controlled not to be activated too for cases where zone 5 is immediately entered into so that the abovedescribed disadvantage might be avoided.

Though the invention has been described with regard to a 1→2 upshift and a 3→2 downshift, operation is similar for a 2→3 upshift and a 4→3 downshift and therefore a further description thereof is not necessary.

SUMMARY OF THE EMBODIMENT

A summary of the control system according to the embodiment described above is as follows:

(1) In a case where the driver performs the kickdown operation in a comparatively low speed of the transmission, the engine is prevented from overrunning and a downshift corresponding to the kickdown operation can be performed with assurance even at a comparatively high speed of the transmission.

More specifically, in control according to the abovedescribed embodiment, it is so arranged that the moment of a velocity increase in 1st speed (low speed) is detected by discriminating the transition from zone 1 to zone 2 (i.e., by discriminating zone 2 and the fact that F=0 holds) through steps S2, S4, S5 and S9 of the flowchart. Further, it is arranged to detect the moment of an increase in load in 3rd speed (i.e., high speed) by discriminating an immediate transition to zone 2 due to a rise in load (i.e., by discriminating zone 2 and the fact that F=1 holds).

The active region of kickdown pressure with respect to the 1-2 shift valve 61 and the 2-3 shift valve 62 when a high load is detected by the kickdown detecting switch 105 is set to zone 1 on the low-velocity side of the first velocity $V_{U2I}$, which is less than the engine overrun point $V_{o1}$, when velocity rises in 1st speed (low speed). When there is an increase in load in 3rd speed (high speed), the active region of kickdown pressure is set to zone 2 on the low-velocity side of the second velocity $V_{U2II}$, which is higher than the first velocity $V_{U2I}$, and to zone 1. In accordance with detection of this zone, the kickdown solenoid 80b is ON/OFF controlled to control the kickdown valve 80.

Accordingly, in the present embodiment, if the operating region is in zone 1, the kickdown solenoid 80b is turned ON and the kickdown pressure acts upon the 1-2 shift valve 61 so that the 1→2 upshift point becomes the velocity $V_{U2}$. The velocity rises from zone 1 and attains velocity $V_{U2I}$, at which it enters zone 2. At this point in time, the kickdown solenoid 80b is turned OFF. Since the kickdown pressure ceases operating at this time, an upshift to 2nd speed is carried out at velocity $V_{U2I}$. At this time the velocity $V_{U2I}$ at which the upshift is performed is less than the velocity $V_{o1}$ of the engine overrun point. Hence, overrun does not occur. Moreover, the velocity at which the peak torque of the engine is produced occurs immediately before the engine overrun point. Therefore, if the velocity $V_{U2I}$ is set at the point of peak torque, an appropriate upshift can be made.

(2) It is possible to absorb variances in shift line caused by slight differences in the manufacture of the shift valves often used in automatic transmissions, as well as a fluctuation in shift line which can arise as a result of applying the same transmission to vehicles of different types. This will be described in greater detail.

(2)-1 If the vehicle is traveling in zone 2 when the driver performs the kickdown operation, the kickdown solenoid 80b is turned ON. Therefore, kickdown pressure acts upon the 2-3 shift valve 62 so that the 3→2 downshift point at the time of this high load moves toward the high-velocity side. As a result, even if the 3→2 downshift line exhibits a variance between line C and line E owing to differences in the manufacture of the shift valve 62, the downshift to 2nd speed will always take place if velocity enters zone 2. This makes it possible to absorb such variances.

(2)-2 Control of the kickdown solenoid 80b in a zone of the low-velocity region in a case where zone 2 is entered for the first time owing to the kickdown operation is made to differ from that in a case where zone 2 is entered by virtue of a kickdown control process. This difference in control is achieved by the existence of step S9 in the flowchart of FIG. 6. On the other hand, in zone 5 of the high-velocity region, control of the kickdown solenoid 80b in a case where zone 5 is entered for the first time owing to the kickdown operation is not made to differ from that in a case where zone 5 is entered by virtue of a kickdown control process. In other words, by making control different, velocity will not attain the overrun velocity in a case where $V_{D1}$ and $V_{o1}$ (or $V_{D2}$ and $V_{o2}$) move farther apart (or closer together), which is caused by a variance in the characteristics of the shift valves.

(2)-3 Setting zone 4 prevents shift hunting which, owing to the characteristic of the 2-3 shift valve, can arise when the minimum velocity $V_{U3I}$ at which an upshift to 3rd speed can take place is lower than the maximum velocity VD2 at which a downshift to 2nd speed can take place.

MODIFICATIONS

The present invention can be modified in various ways without departing from the scope of the claims.

For example, though the foregoing embodiment is an example in which the present invention is applied to a transmission capable of shifting from 1st speed to 4th speed, this does not pose a limitation upon the invention. For instance, the invention is applicable also to a transmission having only 1st, 2nd and 3rd speeds.

Furthermore, whether or not a lock-up mechanism is provided does not affect the range of application of the invention.

The present invention is not limited to the above embodiments and various changes and modifications can be made within the spirit and scope of the present invention. Therefore, to apprise the public of the scope of the present invention, the following claims are made.

What is claimed is:

1. A control apparatus for an automatic transmission having kickdown pressure means for generating kickdown pressure; means for generating governor pressure corresponding to vehicle velocity; means for generating throttle pressure corresponding to engine load; and shift valves to which the kickdown pressure, governor pressure and throttle pressure are applied, wherein the shift valves are changed over in dependence upon an equilibrium relationship among the kickdown, governor and throttle pressures, the control apparatus comprising:

speed detecting means for detecting transmission speed;

operation detecting means for detecting a kickdown operation performed by a driver;

vehicle velocity detecting means for detecting vehicle velocity; and control means, receiving outputs from said speed detecting means, said operation detecting means and said vehicle velocity detecting means, for controlling the kickdown pressure means, wherein, when the transmission speed is a relatively lower speed, kickdown operation is detected and vehicle velocity is rising, said control means controls the kickdown pressure means (a) to apply the kickdown pressure to the shift valves, while the vehicle velocity is within a first velocity region (Z1 or Z4) on a lower velocity side of a first vehicle velocity ($V_{U2I}$ or $V_{U3I}$) which is less than an engine overrun point ($V_{o1}$ or $V_{o2}$);

(b) not to apply the kickdown pressure to the shift valves, while the vehicle velocity is within a second velocity region (Z2 or Z5) which is set from the first vehicle velocity to a second vehicle velocity which exceeds the engine overrun point ($V_{o1}$ or $V_{o2}$); and (c) to apply the kickdown pressure to the shift valves, while the vehicle velocity is within a third velocity region (Z3 or Z6) which exceeds the second vehicle velocity.

2. The control apparatus according to claim 1, wherein the automatic transmission has high and low transmission speeds with the high transmission speed being 2nd speed in a case where the low transmission speed is 1st speed.

3. The control apparatus according to claim 1, wherein the automatic transmission has high and low transmission speeds with the high transmission speed being 3rd speed in a case where the low transmission speed is 2nd speed.

4. A control apparatus for an automatic transmission which has lower speed, intermediate speed and higher speed gears and overruns at the lower speed gear at a first engine overrun point ($V_{o1}$) and which has kickdown pressure means for generating kickdown pressure; means for generating governor pressure corresponding to vehicle velocity; means for generating throttle pressure corresponding to engine load; and shift valves to which the kickdown pressure, governor pressure and throttle pressure are applied, wherein said shift valves are changed over in dependence on an equilibrium relationship among the kickdown, governor and throttle pressures, the control apparatus comprising:

speed detecting means for detecting transmission speed;

operation detecting means for detecting a kickdown operation performed by a driver;

vehicle velocity detecting means for detecting vehicle velocity; and control means, receiving outputs from said speed detecting means, said operation detecting means and said vehicle velocity detecting means, for setting a first velocity zone (Z1) on a lower velocity side of a first vehicle velocity ($V_{U2I}$) which is less than the first engine overrun point ($V_{o1}$), a second velocity zone (Z2) which is set from the first vehicle velocity ($V_{U2I}$) to a second vehicle velocity ($V_{U2II}$) which exceeds the first engine overrun point ($V_{o1}$) and a third velocity zone (Z3) which exceeds the second vehicle velocity ($V_{U2II}$), wherein said control means controls the kickdown pressure means (a) not to apply the kickdown pressure to the shift valves, (i) while the kickdown operation is detected and the vehicle velocity is rising; and (ii) from when the vehicle velocity enters the second velocity zone (Z2) from the first velocity zone (Z1) with the lower speed gear until the vehicle velocity exits the second velocity zone (Z2); and (b) to apply the kickdown pressure to the shift valves, (i) from when the kickdown operation is detected while the vehicle is running in the second velocity zone (Z2) until the vehicle velocity exits the second velocity zone (Z2).

5. The control apparatus according to claim 4 wherein the engine overruns at the intermediate speed gear at a second engine overrun point ($V_{o2}$), and wherein said control means further sets a fourth vehicle velocity zone (Z4) higher than the third vehicle velocity zone (Z3) on a lower side of a third vehicle velocity ($V_{U3I}$) which is less than the upper engine overrun point ($V_{o2}$), a fifth velocity zone (Z5) which is set from the third vehicle velocity ($V_{U3I}$) to a fourth vehicle velocity ($V_{U3II}$) which exceeds the upper engine overrun point ($V_{o2}$), a sixth velocity zone (Z6) which exceeds the fourth vehicle velocity ($V_{U3II}$), and the control means further controls the kickdown pressure means (c) not to apply the kickdown pressure to said shift valves, (i) while the kickdown operation is detected and the vehicle velocity is rising; and (ii) from when the vehicle velocity enters the fifth velocity zone (Z5) from the fourth velocity zone (z4) with the intermediate speed gear until the vehicle velocity exits the fifth velocity zone (Z5); and (d) not to apply the kickdown pressure to said shift valves, (i) from when the kickdown operation is detected while the vehicle is running in the fifth velocity zone (Z5) until the vehicle velocity exits the fifth velocity zone (Z5).

6. The control apparatus according to claim 5, wherein the high transmission speed is 3rd speed in a case where the low transmission speed is 1st speed and the intermediate speed is 2nd speed.

7. The control apparatus according to claim 6, wherein the third vehicle velocity ($V_{U31}$) is set between a maximum vehicle velocity ($V_{23}$) along an ordinary up-shift line from 2nd to 3rd speed and a maximum vehicle velocity ($V_{D2}$) at which an engine overrun condition does not occur at the intermediate speed gear.

8. The control apparatus according to claim 7, wherein a case where the third vehicle velocity ($V_{U31}$) is set close to the vehicle velocity ($V_{D2}$), a vehicle velocity point (VD2') which defines a lower limit of the fourth velocity zone (Z4) is set larger than the vehicle velocity ($V_{23}$) along the ordinary up-shift line from 2nd to 3rd speed.

9. The control apparatus according to claim 8, wherein said control means further controls the kickdown pressure means
   (e) not to apply the kickdown pressure to the shift valves,
      (i) from when the kickdown operation is detected while the vehicle is running in the fifth velocity zone (Z5) until the vehicle velocity exits the fifth velocity zone (Z5); and
   (f) to apply the kickdown pressure to the shift valves,
      (i) as long as the kickdown operation is detected and the vehicle velocity is raising; and
      (ii) from when the vehicle velocity enters the sixth velocity zone (Z6) until the vehicle velocity exits the sixth velocity zone (Z6).

10. The control apparatus according to claim 4 wherein the high transmission speed is 3rd speed in a case where the low transmission speed is 1st speed and the intermediate speed is 2nd speed.

11. The control apparatus according to claim 10, wherein said second vehicle velocity ($V_{U2II}$) is set close to a maximum vehicle velocity ($V_{32}$) along an ordinary downshift line from 3rd speed to 2nd speed in a case where kickdown pressure is not applied to the shift valves.

12. The control apparatus according to claim 10, wherein said first velocity ($V_{U2I}$) is set higher than a maximum vehicle velocity ($V_{D1}$) at which an engine overrun condition does not occur at the 1st speed.

* * * * *

UNITED STATES PATENT AND TRADEMARK OFFICE
CERTIFICATE OF CORRECTION

PATENT NO. : 5,048,373
DATED : September 17, 1991
INVENTOR(S) : Sumimoto, et. al.

It is certified that error appears in the above-identified patent and that said Letters Patent is hereby corrected as shown below:

Col. 4, line 33, "lower $V_{U3I}$. when" should be --lower than $V_{U3I}$. When--.

Col. 8, line 48, "line" (second occurrence) should be --lines--.

Col. 12, line 40, "ing it" should be --ing, it--;
line 67, "VU2II" should be --$V_{U2II}$--.

Col. 18, line 36, "$v_{U3I}$." should be --$V_{U3I}$.--.

Col. 19, line 46, "abovedescribed" should be --above-described--.

Signed and Sealed this

Twenty-third Day of February, 1993

*Attest:*

STEPHEN G. KUNIN

*Attesting Officer*   Acting Commissioner of Patents and Trademarks